United States Patent
Watt

(10) Patent No.: US 7,203,131 B2
(45) Date of Patent: Apr. 10, 2007

(54) PIXEL DISPLAY METHOD AND APPARATUS

(75) Inventor: Darrell J. Watt, Marietta, GA (US)

(73) Assignee: Johnson Outdoors Inc., Racine, WI (US)

(*) Notice: Subject to any disclaimer, the term of this patent is extended or adjusted under 35 U.S.C. 154(b) by 154 days.

(21) Appl. No.: 10/935,475

(22) Filed: Sep. 7, 2004

(65) Prior Publication Data
US 2005/0135191 A1 Jun. 23, 2005

Related U.S. Application Data

(60) Provisional application No. 60/500,064, filed on Sep. 4, 2003.

(51) Int. Cl.
*G01S 15/89* (2006.01)

(52) U.S. Cl. ..................................... 367/111

(58) Field of Classification Search ................ 367/111
See application file for complete search history.

(56) References Cited

U.S. PATENT DOCUMENTS

| 4,829,493 A | * | 5/1989 | Bailey | ........................ 367/111 |
| 6,292,218 B1 | * | 9/2001 | Parulski et al. | .......... 348/220.1 |

* cited by examiner

*Primary Examiner*—Ian J. Lobo
(74) *Attorney, Agent, or Firm*—Kinney & Lange, P.A.

(57) ABSTRACT

A liquid crystal display (LCD) for a sonar depth-finding device includes a matrix of pixels, each pixel having a first dimension and a second dimension greater than the first dimension such that a ratio of the second dimension to the first dimension is approximately an integer value greater than one. Pixels in the matrix are configured to be operatively associated by the sonar depth-finding device to define a substantially square combined pixel.

4 Claims, 2 Drawing Sheets

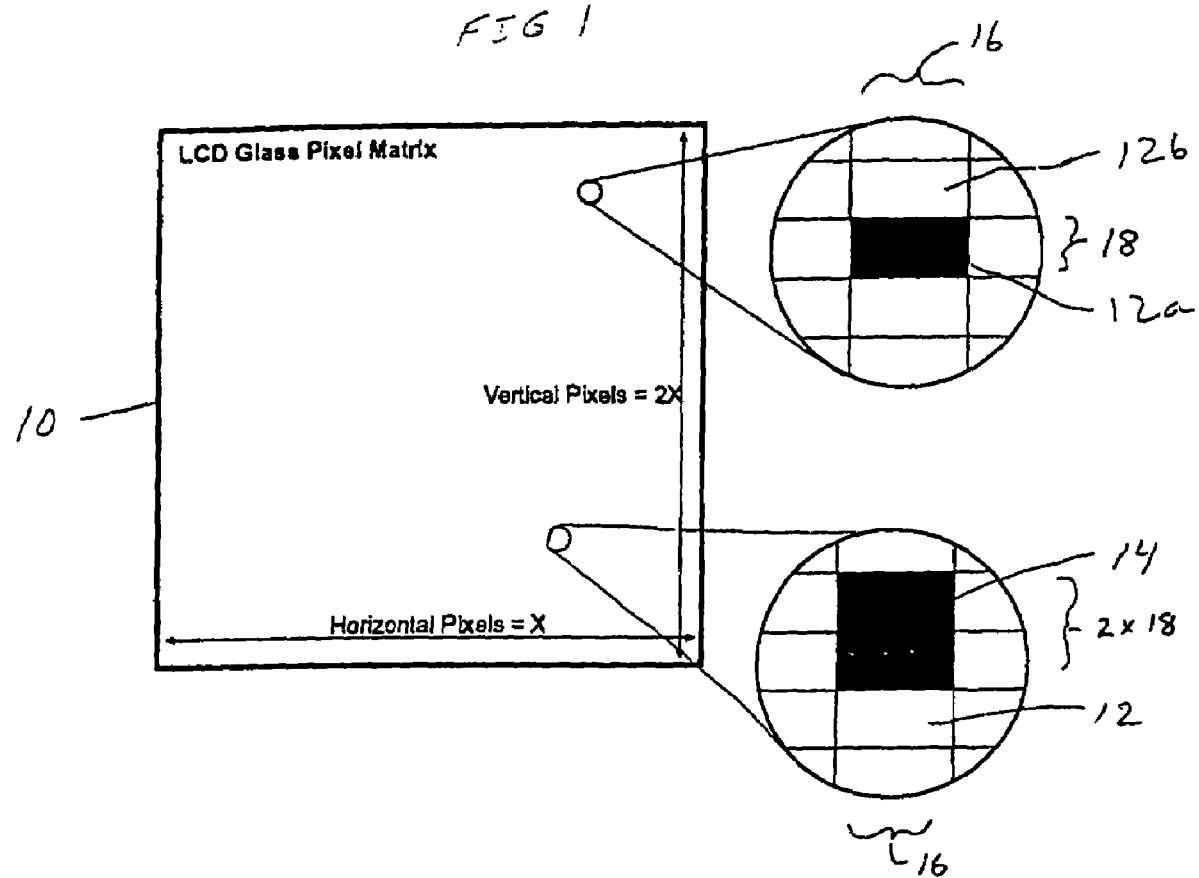
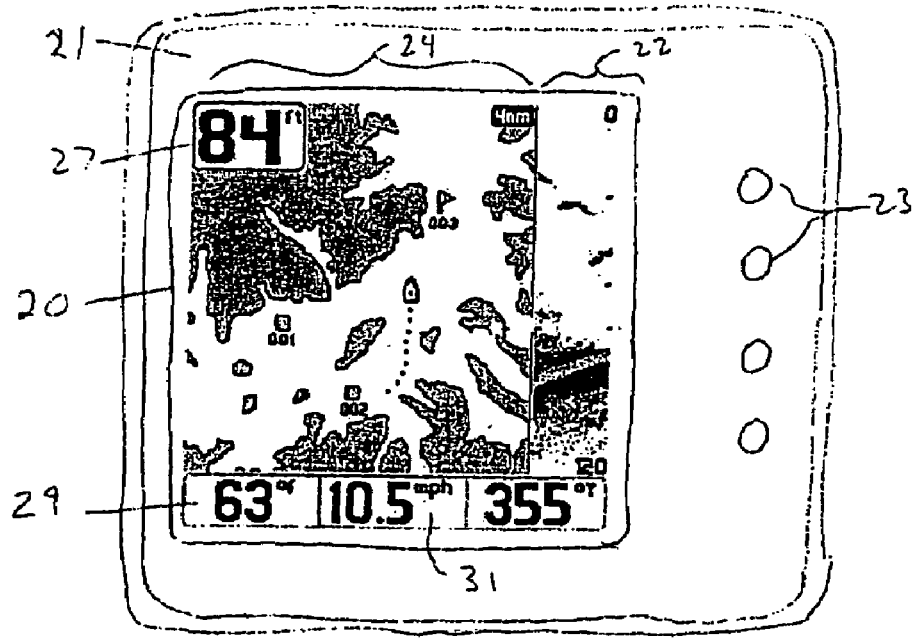

PIXEL DISPLAY METHOD AND APPARATUS

CROSS-REFERENCE TO RELATED PATENT APPLICATIONS

This application claims the benefit of U.S. Provisional Application No. 60/500,064, filed Sep. 4, 2003 and entitled "Pixel Display Method and Apparatus," the entire contents of which are hereby incorporated by reference.

BACKGROUND

The present invention relates to display screens for combination sonar depth finders and mapping and/or position plotting devices. More particularly, the present invention relates to display screens configured to selectively provide a lower or higher resolution for simultaneous display of various types of information from combination sonar depth finders and mapping and/or position plotting devices.

Liquid crystal display (LCD) devices illuminate individual pixels in a matrix of pixels to provide an image on the display. LCD devices are often used in electronic devices such as calculators, computer display monitors, clocks, displays on microwave ovens, CD players, and marine sonar depth and fish finder devices. The number of pixels in the LCD matrix defines the resolution of the LCD. For sonar depth finder devices, a greater number of vertical pixels enables higher resolution of the images of underwater articles from which sonar echoes are returned. In addition to display of images representative of sonar echoes, some depth finder devices also display moving images representative of maps, such as water channels, rivers, and lakes, and associated land and island shore lines, and also plot the position and movement of a boat. Line and map drawing algorithms draw images in pixel representations that are organized for square pixels. Square pixels display images without distortion as well as being efficient for a computer processor to evaluate and control pixel illumination. The pixels in the LCD device accordingly have a 1:1 ratio of horizontal-to-vertical sizing. The display requirements of combination sonar depth finding and mapping and/or position plotting devices and such devices in combination with global positioning systems or other devices that can determine position thus have competing requirements for a higher resolution in a vertical dimension while needing square or 1:1 ratio pixels for mapping display requirements.

Accordingly, there is a need for an LCD display screen for combination sonar depth finders and mapping and/or position plotting devices that is configured to selectively provide a higher resolution in a vertical dimension for displaying images such as sonar images, and to selectively provide a lower two-dimensional resolution for simultaneously displaying images such as maps or position plots.

SUMMARY

According to an exemplary embodiment, a liquid crystal display (LCD) for a sonar depth-finding device includes a matrix of pixels, each pixel having a first dimension and a second dimension greater than the first dimension such that a ratio of the second dimension to the first dimension is approximately an integer value greater than one. Pixels in the matrix are configured to be operatively associated by the sonar depth-finding device to define a substantially square combined pixel.

According to another exemplary embodiment, a liquid crystal display (LCD) for a sonar depth-finding device includes a matrix of substantially rectangular pixels, each pixel having a first length and a second length different from the first length. Adjacent pixels in the matrix are configured to be operatively associated by the sonar depth-finding device to define a substantially square combined pixel.

According to another exemplary embodiment, a liquid crystal display (LCD) for a sonar depth-finding device includes a matrix of substantially rectangular pixels having a first number of pixels in a first dimension of the matrix and a second number of pixels in a second dimension of the matrix, each pixel having a side of a first length in the first dimension and a side of a second length in the second dimension, the first length greater than the second length such that a ratio of the first length to the second length is approximately an integer value greater than one. Each pixel of the LCD for the sonar depth-finding device is configured to be operatively associated with an adjacent pixel in the second dimension to define a substantially square combined pixel.

According to another exemplary embodiment, a sonar depth-finding device includes a matrix of substantially rectangular pixels, each pixel having a first length and a second length different from the first length. The sonar depth-finding device is configured to display sonar information by independently activating individual pixels, and to simultaneously display at least one of mapping and positional information by operatively associating two or more adjacent pixels to define a substantially square combined pixel.

According to another exemplary embodiment, a method of displaying information in a sonar depth-finding device includes displaying sonar information by independently activating individual pixels in a matrix of pixels, and displaying simultaneously at least one of mapping and positional information by operatively associating two or more adjacent pixels to define a substantially square combined pixel.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 1 illustrates an LCD pixel matrix according to an exemplary embodiment;

FIG. 2 illustrates an exemplary embodiment of a sonar display screen using the LCD pixel matrix illustrated in FIG. 1 to display information.

DETAILED DESCRIPTION

Figure 3:
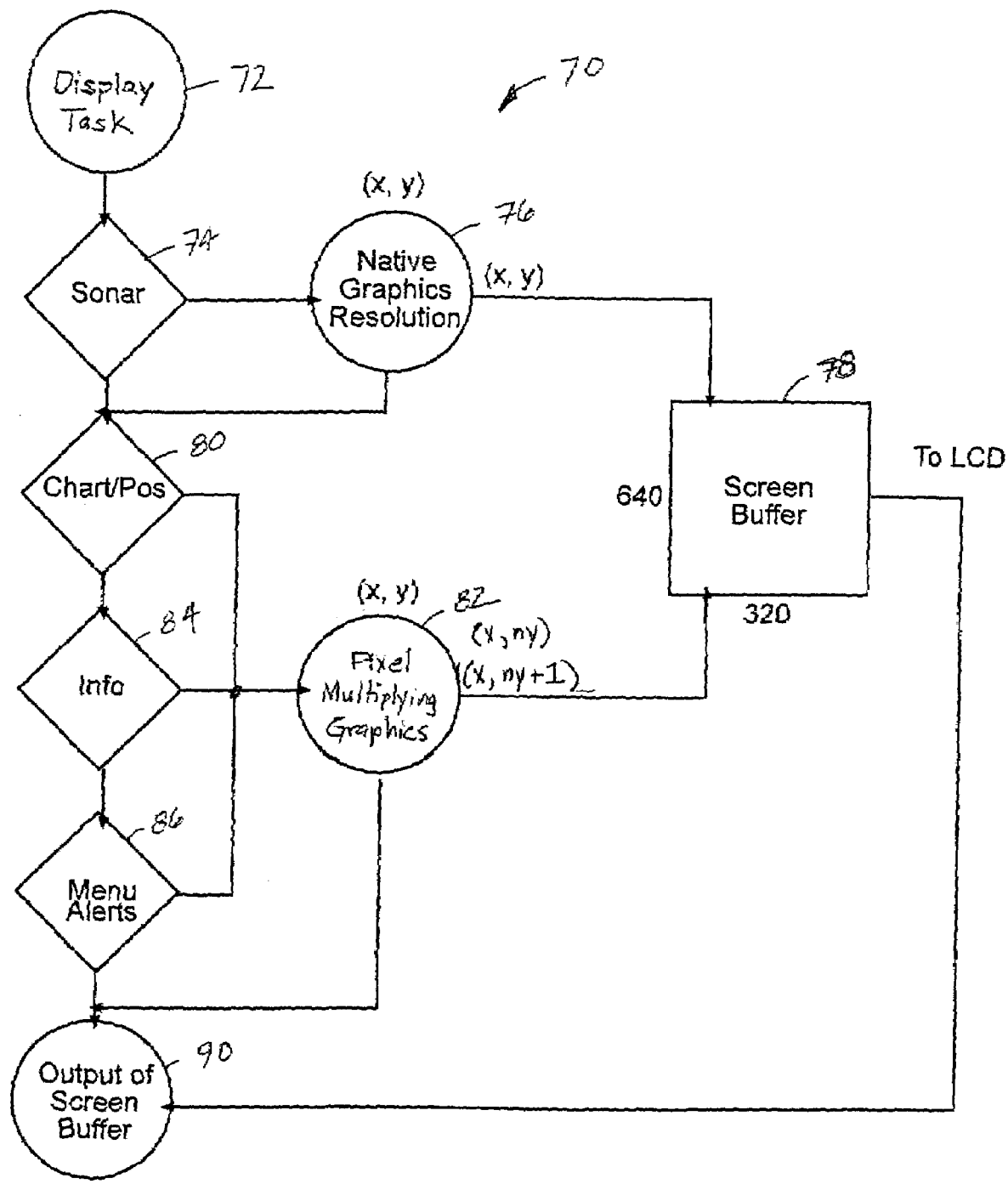
FIG. 3 is a data flow diagram which illustrates a process for displaying information on an LCD pixel matrix according to an exemplary embodiment.

FIG. 1 illustrates an LCD pixel matrix 10 according to an exemplary embodiment. LCD pixel matrix 10 may be used, for example, as a display for combination sonar depth finders and mapping and/or position plotting devices. LCD pixel matrix 10 is configured to selectively display information at a higher resolution in a vertical dimension, such as sonar return images, while simultaneously displaying information at a lower two-dimensional resolution, such as graphic images of maps and/or position plotting information.

LCD pixel matrix 10 includes a plurality of substantially rectangular pixels 12 in a two-dimensional X-Y matrix of pixels. Each pixel 12 is independently addressable for selective illumination. Each pixel 12 has an X-dimensional length and a Y-dimensional length different from the X-dimensional length. The pixels 12 are sized to have a horizontal-to-vertical ratio (H:V) of an integer (greater-than-one)-to-one ratio, such as a ratio 2:1, 3:1, 4:1, and so forth. In the illustrated embodiment, LCD pixel matrix 10 has a horizontal-to-vertical ratio of 2:1.

As a result of each pixel 12 having a horizontal-to-vertical ratio of an integer (greater than one)-to-one, LCD pixel matrix 10 is configured to selectively provide a higher resolution in the vertical dimension by providing a greater number of vertical pixels, such as in embodiments where LCD pixel matrix 10 is substantially square in shape, and by independently illuminating each individual pixel in the vertical dimension. High vertical resolution is particularly suited for display of information from of sonar return echoes. A vertical orientation with a high number of pixels represents a column of water below a boat. The column of pixels displays sonar echoes from underwater articles, including bottom surfaces, fish, obstructions, and other detected articles, within a range of depth set conventionally using a sonar depth finder.

LCD pixel matrix 10 is also configured to selectively provide a lower two-dimensional resolution for the substantially undistorted display of images. To provide a lower two-dimensional resolution, two or more adjacent pixels 12 in the Y dimension can be operationally associated (e.g., using electronic logic) to define a single combined pixel 14 (i.e. a multi-pixel) having a horizontal-to-vertical ratio of approximately 1:1. For pixels having a horizontal-to-vertical ratio of an integer (greater than 1)-to-1, a combination of that integer number of adjacent consecutive pixels 12 in the Y dimension results in a square multi-pixel 14. By way of example, in the illustrated embodiment, each pixel 12 has a horizontal-to-vertical ratio of 2:1, that is, the width (horizontal dimension 16) of each pixel 12 is twice as long as the height (vertical dimension 18) of each pixel 12. Accordingly, two adjacent pixels 12a and 12b may be illuminated to define combined pixel 14, which is a substantially square pixel having a horizontal-to-vertical ratio of approximately 1:1. Square pixels are preferable for displaying substantially undistorted images such as maps or position plotting.

It is to be appreciated that some variation in the horizontal-to-vertical ratio of each pixel 12 provides visually acceptable and substantially undistorted display of information. Horizontal-to vertical ratio values up to about plus or minus 33% of an integer value provide reasonably acceptable limits on the distortion of the mapping information. Generally, a distortion of approximately 5% is not readily noticeable, a distortion of approximately 15% distortion is noticeable, and a distortion of approximately 33% is a reasonable upper limit of acceptable distortion. Thus, for each pixel 12 with a horizontal-to-vertical ratio of N:1, where L is a nearest rounded integer to N and is greater than 1, and where N is in the range of approximately 33% less than L to approximately 33% greater than L, a group of L adjacent pixels 12 in the Y dimension defines a substantially square combined pixel having a horizontal-to-vertical ratio of approximately 1:1. This range of N is sufficient to provide a substantially undistorted two-dimensional display of information.

FIG. 2 illustrates a sonar display screen 20 of a depth and fish finder device 21 using the LCD pixel matrix 10 illustrated in FIG. 1 to simultaneously display sonar graphic information 22 and map graphic information 24. Conventional icon or graphics portions provide a visual display including but not limited to bottom depth 27, water temperature 29, vessel speed 31, and other such information. According to an exemplary embodiment, the pixels in the screen 20 are in a 640-pixel vertical by 320-pixel horizontal array, in which each pixel has a horizontal length that is twice as long as its vertical length.

Referring again to FIG. 1, to display substantially undistorted images of maps and/or position plotting, a process converts the map information and/or position plotting information into an image by associating two or more adjacent pixels (e.g., pixels 12a and 12b) in the Y dimension to define a substantially square combined pixel 14. A controller (hardware or software) driving LCD pixel matrix 10 illuminates the two or more associated adjacent pixels 12 to display a portion of an image as combined pixel 14.

FIG. 3 illustrates a process 70 for displaying information on an LCD pixel matrix according to an exemplary embodiment. Process 70 begins with a step 72, in which a display task is initiated. In a step 74, if updated sonar information needs to be sent to the display, the updated sonar information is sent to a native graphics function 76 which translates the updated sonar information to a screen buffer 78 using a one-to-one (1:1) ratio. Information from native graphics function 76 is saved in screen buffer 78 for output to the display (e.g., a 640-pixel vertical by 320-pixel horizontal LCD display).

If no updated sonar information needs to be sent to the display, or after the updated sonar information is mapped by native graphics function 76, the process continues with a step 80. In step 80, if updated map or positional information needs to be sent to the display, the updated map or positional information is sent to a pixel multiplying graphics function 82 (e.g., a pixel doubling graphics function). Pixel multiplying graphics function 82 translates the updated map or positional information to screen buffer 78 using an n-to-one ratio, where n is an integer greater than one (e.g., n=2 for a pixel doubling graphics function), such that n vertically adjacent pixels in the display are associated with each other to form a combined pixel for displaying a substantially undistorted image of the updated map or positional information with a lower resolution than the updated sonar information. Information from pixel multiplying graphics function 82 is saved in screen buffer 78 for output to the display.

Similarly, in a step 84 and a step 86, if other updated information or menu alerts need to be sent to the display, the other updated information and menu alerts are sent to pixel multiplying graphics function 82. Pixel multiplying graphics function 82 translates the other updated information and menu alerts to screen buffer 78 using the n-to-one ratio such that n adjacent pixels in the display are associated with each other to form a combined pixel for displaying the other updated information and menu alerts with a lower resolution than the updated sonar information. Information from pixel multiplying graphics function 82 is saved in screen buffer 78 for output to the display. When all updated information has been processed, the output from screen buffer 78 is sent to the display.

The principles, preferred embodiments, and modes of operation of the present invention have been described in the foregoing specification. The invention is not to be construed as limited to the particular forms disclosed as these are regarded as illustrative rather than restrictive. Moreover, variations and changes may be made by those skilled in the art without departing from the spirit of the invention described in the following claims.

What is claimed is:

1. A sonar depth-finding device comprising:
    a matrix of substantially rectangular pixels, each pixel having a first length in a vertical dimension and a second length in a horizontal dimension different from the first length, wherein a ratio of the second length to the first length is approximately an integer value N greater than one;
    wherein the sonar depth-finding device is configured to display first information by independently activating individual pixels, and to display second information by operatively associating N vertically adjacent pixels to define a substantially square combined pixel; and
    wherein first information includes sonar information and second information includes at least one of mapping and positional information.

2. The sonar depth-finding device of claim 1, wherein the sonar depth-finding device is configured to simultaneously display the sonar information and the at least one of mapping and positional information.

3. The sonar depth-finding device of claim 1, further comprising a controller configured to operatively associate N vertically adjacent pixels to define the substantially square combined pixel.

4. A method of displaying information in a sonar depth-finding device, the method comprising:
    displaying sonar information by independently activating individual pixels in a matrix of pixels, the individual pixels having a height and width, the width being greater than the height such that a ratio of the width to the height is approximately an integer value N greater than one; and
    displaying simultaneously at least one of mapping and positional information by operatively associating N vertically adjacent pixels to define a substantially square combined pixel.

* * * * *

UNITED STATES PATENT AND TRADEMARK OFFICE
CERTIFICATE OF CORRECTION

PATENT NO. : 7,203,131 B2
APPLICATION NO. : 10/935475
DATED : April 10, 2007
INVENTOR(S) : Darrell J. Watt It is certified that error appears in the above-identified patent and that said Letters Patent is hereby corrected as shown below:

Column 3, Line 24, delete "information from of", insert --information from--

Column 3, Line 55, delete "Horizontal-to vertical", insert --Horizontal-to-vertical--

Signed and Sealed this

Tenth Day of July, 2007

JON W. DUDAS
*Director of the United States Patent and Trademark Office*